United States Patent
Hasegawa et al.

(10) Patent No.: US 11,512,871 B2
(45) Date of Patent: Nov. 29, 2022

(54) WATER HEATER

(71) Applicant: NORITZ CORPORATION, Hyogo (JP)

(72) Inventors: Hiroki Hasegawa, Kobe (JP); Takashi Akiyama, Kobe (JP); Keigo Fukunishi, Kobe (JP); Koji Ota, Kobe (JP); Ryosuke Umakoshi, Kobe (JP)

(73) Assignee: NORITZ CORPORATION, Hyogo (JP)

( * ) Notice: Subject to any disclaimer, the term of this patent is extended or adjusted under 35 U.S.C. 154(b) by 337 days.

(21) Appl. No.: 16/822,589

(22) Filed: Mar. 18, 2020

(65) Prior Publication Data
US 2020/0217557 A1    Jul. 9, 2020

Related U.S. Application Data

(63) Continuation of application No. PCT/JP2018/029915, filed on Aug. 9, 2018.

(30) Foreign Application Priority Data

Sep. 26, 2017  (JP) .............................. JP2017-184377
Jan. 25, 2018  (JP) .............................. JP2018-010369

(51) Int. Cl.
*F24H 1/00*  (2022.01)
*F23C 5/02*  (2006.01)
(Continued)

(52) U.S. Cl.
CPC ............. *F24H 1/0036* (2013.01); *F23C 5/02* (2013.01); *F23C 7/008* (2013.01); *F23K 5/007* (2013.01);
(Continued)

(58) Field of Classification Search
None
See application file for complete search history.

(56) References Cited

U.S. PATENT DOCUMENTS

2007/0204980 A1    9/2007  Kim et al.

FOREIGN PATENT DOCUMENTS

EP         880000396 Y1 *  3/1988
EP         0343937 A1 *  11/1989
(Continued)

OTHER PUBLICATIONS

English Translation of JP-2017150734-A (Year: 2017).*
(Continued)

*Primary Examiner* — Michael G Hoang
*Assistant Examiner* — Kurt J Wolford
(74) *Attorney, Agent, or Firm* — Studebaker & Brackett PC

(57) ABSTRACT

Provided is a water heater including a burner that receives a supply of combustion air from a fan, a heat exchanger having a heat transfer tube, and a combustion chamber case in which a combustion chamber of the burner is formed in the interior thereof and which is to be capable of guiding combustion gas generated by the burner to the heat exchanger. The water heater further includes a unit case that surrounds the combustion chamber case, and a region on the outside of the combustion chamber case within the unit case serves as an air pressure chamber having a higher pressure than the combustion chamber. Thus, combustion gas leakage to the outside can be prevented or suppressed appropriately by means of a simple configuration.

16 Claims, 13 Drawing Sheets

(51) Int. Cl.

| | | |
|---|---|---|
| *F23C 7/00* | (2006.01) | |
| *F23K 5/00* | (2006.01) | |
| *F23L 1/00* | (2006.01) | |
| *F23L 17/00* | (2006.01) | |
| *F24D 17/00* | (2022.01) | |
| *F24H 9/20* | (2022.01) | |
| *F23M 7/00* | (2006.01) | |
| *F28F 1/20* | (2006.01) | |

(52) U.S. Cl.
CPC ............... *F23L 1/00* (2013.01); *F23L 17/005* (2013.01); *F23M 7/00* (2013.01); *F24D 17/0005* (2013.01); *F24H 9/2035* (2013.01); *F24H 9/2042* (2013.01); *F28F 1/20* (2013.01); *F23D 2209/10* (2013.01)

(56) References Cited

FOREIGN PATENT DOCUMENTS

| | | | | |
|---|---|---|---|---|
| EP | 0493345 | A2 * | 7/1992 | |
| EP | 0859204 | A2 * | 8/1998 | |
| EP | 0940640 | A2 * | 9/1999 | |
| EP | 2390594 | A2 * | 11/2011 | ............ F23L 15/04 |
| JP | S55-81642 | U | 6/1980 | |
| JP | S60-23659 | U | 2/1985 | |
| JP | S62-108752 | U | 7/1987 | |
| JP | H03-3800 | Y2 | 1/1991 | |
| JP | 2005-282919 | A | 10/2005 | |
| JP | 2006-145179 | A | 6/2006 | |
| JP | 2006-266516 | A | 10/2006 | |
| JP | 2007-517180 | A | 6/2007 | |
| JP | 4544512 | B2 | 9/2010 | |
| JP | 2017-009232 | A | 1/2017 | |
| JP | 2017009232 | A * | 1/2017 | |
| JP | 2017-150734 | A | 8/2017 | |
| JP | 2017150734 | A * | 8/2017 | |

OTHER PUBLICATIONS

English Translation of JP-2017009232-A (Year: 2017).*
English Translation of EP-2390594-A2 (Year: 2011).*
English Translation of EP 0940640 A2 (Year: 1999).*
English Translation of EP 0859204 A2 (Year: 1998).*
English Translation of EP 0493345 A2 (Year: 1992).*
English Translation of EP 0343937 A1 (Year: 1989).*
English Translation of KR 880000396 Y1 (Year: 1988).*
Norlok (Year: 2015).*
Norlok Accessibility Date (Year: 2022).*
CPI (Year: 2014).*
CPI Accessibility Date (Year: 2022).*
Wyoming Machine (Year: 2013).*
Wyoming Machine Accessibility Date (Year: 2022).*
International Search Report issued in PCT/JP2018/029915; dated Nov. 13, 2018.

* cited by examiner

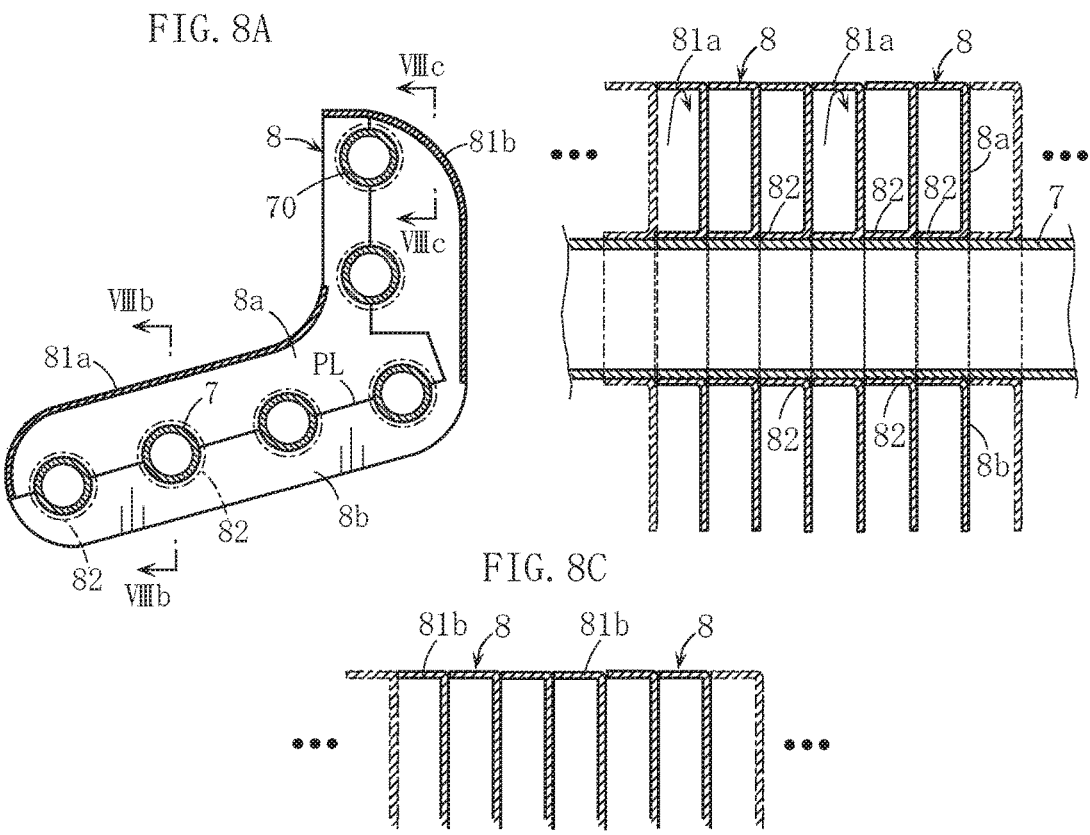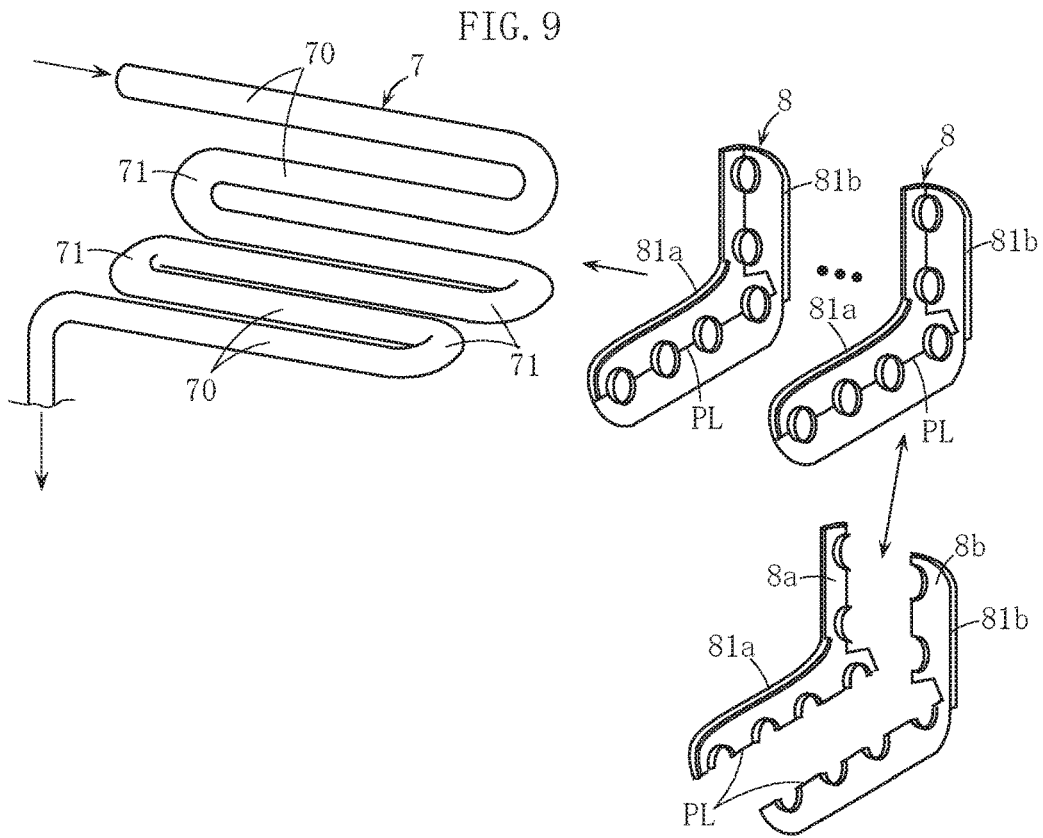

WATER HEATER

TECHNICAL FIELD

The present invention relates to a water heater such as a hot water supply device.

BACKGROUND ART

A specific example of a water heater includes a burner that receives a supply of combustion air from a fan, and a heat exchanger for heating water to be heated by recovering heat from combustion gas generated by the burner (see PTL 1 and 2, for example). This type of water heater is provided with a combustion chamber case that houses the burner in the interior thereof and surrounds a combustion chamber of the burner. The combustion gas is guided to the heat exchanger using the combustion chamber case.

In the water heater described above, it is necessary to appropriately prevent the combustion gas from leaking out of the combustion chamber case and the heat exchanger. For example, an opening portion used to perform maintenance on the burner and so on is provided in the combustion chamber case, and normally, the opening portion is blocked by a lid member. However, when the attachment location of the lid member has a poor hermetic sealing property, combustion gas leaks out through the opening portion. Further, a spark plug and other members are often attached to the combustion chamber case. However, when the attachment portions thereof have a poor hermetic sealing property, combustion gas again leaks out. Furthermore, conventionally, a configuration in which the combustion chamber case, which serves as a burner case, and a can body of the heat exchanger, which is formed separately thereto, are connected by a flange is frequently employed. However, this type of flange connection portion may also form a location through which combustion gas leaks out.

Conventionally, therefore, as means for improving the hermetic sealing property so that combustion gas does not leak out through the locations described above, a large amount of expensive sealing packing may be used, or means that increase the number of locations on the connection subject members that are fastened with screws may be employed. Under these circumstances, productivity deteriorates, and manufacturing costs increase.

CITATION LIST

Patent Literature

[PAL 1] Japanese Patent No. 4544512
[PAL 2] Japanese Utility Model Application Publication No. S62-108752

SUMMARY OF INVENTION

Technical Problem

An object of the present invention is to provide a water heater with which the problems described above can be prevented or suppressed appropriately so that a reduction in manufacturing cost can be achieved.

Solution to Problem

To solve the problems described above, the present invention teaches the following technical means.

A water heater provided by the present invention includes a fan, at least one burner that receives a supply of combustion air from the fan, a heat exchanger used for heat recovery, a combustion chamber case configured such that a combustion chamber of the burner is formed in the interior thereof and so as to be capable of guiding combustion gas generated by the burner to the heat exchanger, a unit case surrounding the combustion chamber case, and an air pressure chamber formed from a region on the outside of the combustion chamber case within the unit case and set at a higher pressure than the combustion chamber.

Preferably, a part of the combustion air discharged from the fan is supplied to the combustion chamber, the other part being supplied to the air pressure chamber, and the pressure in the air pressure chamber is higher than the pressure in the combustion chamber because flow passage resistance in an air flow passage extending from the fan to the combustion chamber is greater than flow passage resistance in an air flow passage extending from the fan to the air pressure chamber.

Preferably, the air pressure chamber is provided to extend to a region on the outside of the heat exchanger within the unit case, and the pressure in the air pressure chamber is higher than the pressure in a region inside the heat exchanger.

Preferably, the unit case includes a unit case front portion and a unit case rear portion that can be coupled to each other, and the unit case front portion and the unit case rear portion can be assembled so as to sandwich the combustion chamber case and the heat exchanger from a front-rear direction thereof.

The water heater according to the present invention preferably further includes a plurality of flange portions provided on respective outer peripheries of the unit case front portion and the unit case rear portion, wherein the unit case front portion and the unit case rear portion are coupled to each other by bringing the plurality of flange portions into contact with each other and performing crimping thereon.

Preferably, at least one of a water-introducing pipe body portion and a hot water-discharging pipe body portion of the heat exchanger is drawn out to the exterior of the unit case from the interior thereof so as to be sandwiched between mating faces of the unit case front portion and the unit case rear portion.

The water heater according to the present invention preferably further includes a combustion chamber front lid capable of blocking a first opening portion provided in a front surface portion of the combustion chamber case, and a unit case front lid capable of blocking a second opening portion provided in a front surface portion of the unit case, wherein, in a state where the first and second opening portions are open, the burner can be inserted into and removed from the combustion chamber case from the exterior of the unit case.

Preferably, the fan and a drive motor thereof are housed in the unit case.

Preferably, the fan and the drive motor thereof are housed in the unit case so as to be positioned below the burner and are tilted so that a front side thereof is inclined downward, whereby the fan and the drive motor thereof decrease steadily in height toward parts thereof close to the first and second opening portions.

Preferably, a recessed portion shaped to open upward is provided in an upper portion of the combustion chamber case so that a heat transfer tube of the heat exchanger can be fitted therein and held thereby.

Preferably, the heat exchanger is set as a primary heat exchanger, the water heater according to the present invention further includes a secondary heat exchanger for heating water to be heated, which is configured separately to the primary heat exchanger, an upper portion of the unit case is provided with a narrow portion having a smaller front-rear width than other parts of the unit case, and a shelf-form wall portion connected to a front side or a rear side of a lower portion of the narrow portion in order to carry the secondary heat exchanger, an exhaust port is provided in a front wall portion or a rear wall portion of the narrow portion, and combustion gas that advances upward from the burner and passes through the primary heat exchanger is supplied to the secondary heat exchanger through the exhaust port.

The water heater according to the present invention preferably further includes a temperature fuse provided in the air pressure chamber in order to sense an abnormal increase in the temperature of the air pressure chamber.

The water heater according to the present invention preferably further includes an air passage for causing air in the air pressure chamber to flow out to a different site to the air pressure chamber so that an air flow is generated in the location of the temperature fuse.

The water heater according to the present invention preferably further includes a gas supply manifold that is disposed in the unit case so as to be positioned on a front side of the burner, and supplies the burner with fuel gas.

Preferably, a front-side region of the gas supply manifold forms a part of the air pressure chamber.

The water heater according to the present invention preferably further includes a burner holder portion, wherein the burner holder portion includes a flow regulating plate portion on which the burner is placed, a front-side upright wall portion that stands upright from a front portion of the flow regulating plate portion and has a hole portion for supplying fuel gas to the burner therein, and a burner engaging/holding portion provided on the front-side upright wall portion in order to fix the position of a front portion of the burner, the front-side upright wall portion includes an upright plate portion erected in an up-down height direction above the hole portion for supplying fuel gas, and a cut-and-raised portion connected integrally to the upright plate portion and bent so as to extend to a rear side of the upright plate portion from an edge portion of an opening portion provided in the upright plate portion, the burner engaging/holding portion is formed from the cut-and-raised portion, and the gas supply manifold is positioned on a front side of the upright plate portion so as to block the opening portion.

The water heater according to the present invention preferably further includes sealing packing that is interposed between the gas supply manifold and the upright plate portion and open in a location facing the opening portion.

The water heater according to the present invention preferably includes, as the opening portion and the cut-and-raised portion, a plurality of opening portions and a plurality of cut-and-raised portions arranged intermittently in a left-right lateral width direction of the upright plate portion.

Preferably, an air flow hole enabling a part of the air in the air pressure chamber to flow into the combustion chamber case through the opening portion in the upright plate portion is provided in the gas supply manifold.

Other features and advantages of the present invention will become more apparent from the embodiments of the invention, which are described below with reference to the attached figures.

BRIEF DESCRIPTION OF DRAWINGS

FIG. 8A is a VIIIa-VIIIa sectional view of FIG. 7, FIG. 8B is a VIIIb-VIIIb sectional view of FIG. 8A, and FIG. 8C is a VIIIc-VIIIc sectional view of FIG. 8A.

FIG. 9 is an exploded perspective view showing main parts of a heat transfer tube and a fin constituting the primary heat exchanger of the water heater shown in FIG. 1.

DESCRIPTION OF EMBODIMENTS

Preferred embodiments of the present invention will be described specifically below with reference to the figures.

Figure 1:
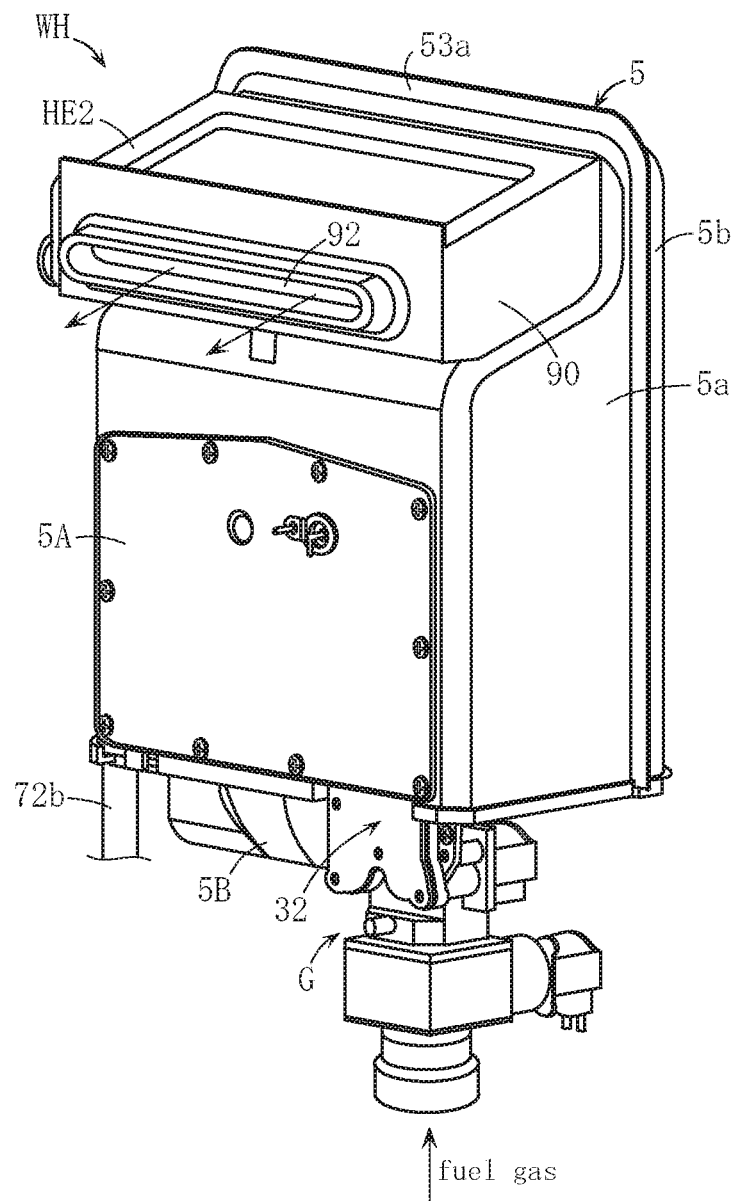
FIG. 1 is an external perspective view showing an example of a water heater according to the present invention.
Figure 2:
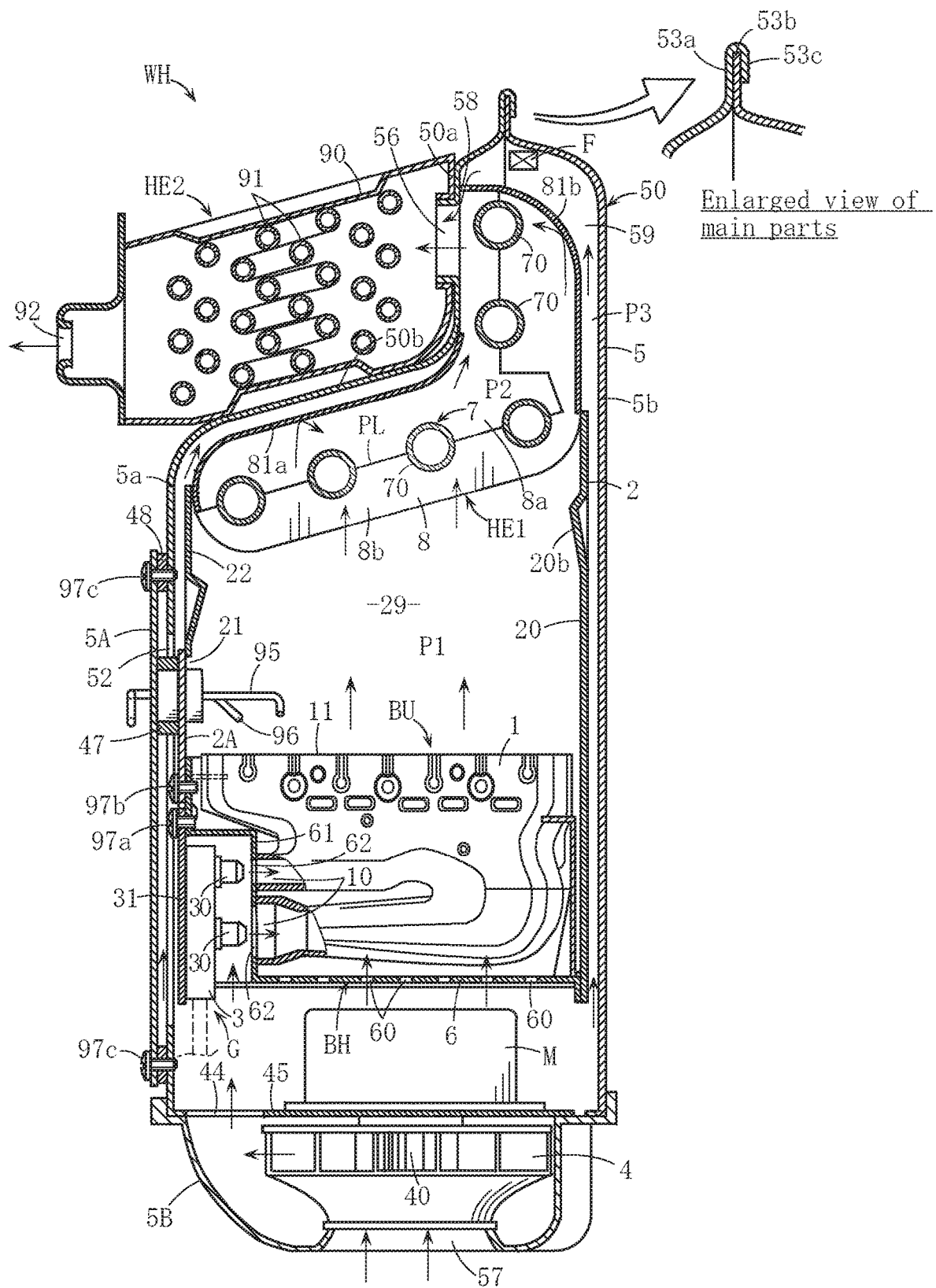
FIG. 2 is a side sectional view of the water heater shown in FIG. 1.
Figure 3:
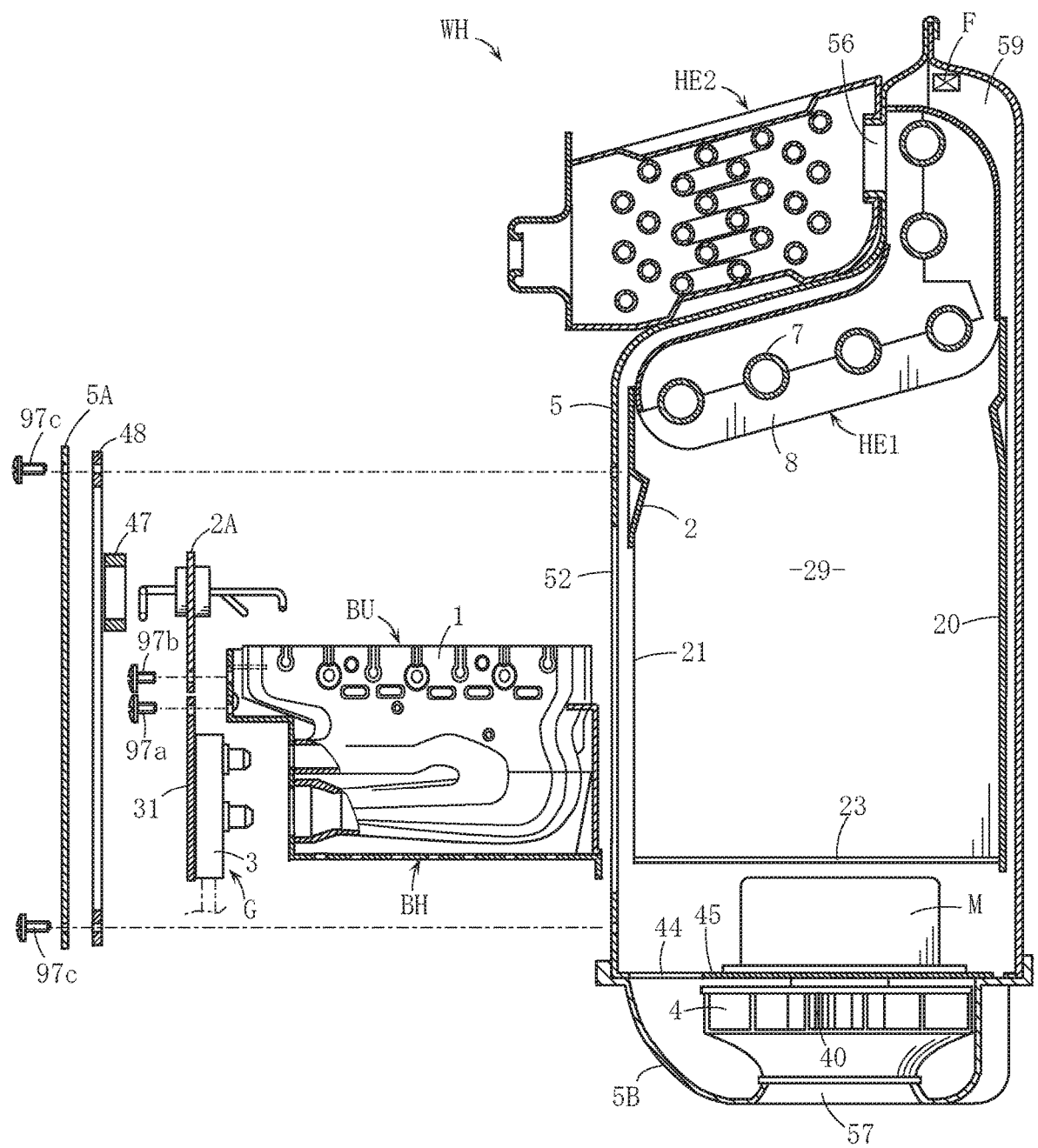
FIG. 3 is an exploded sectional view of FIG. 2.
Figure 4:
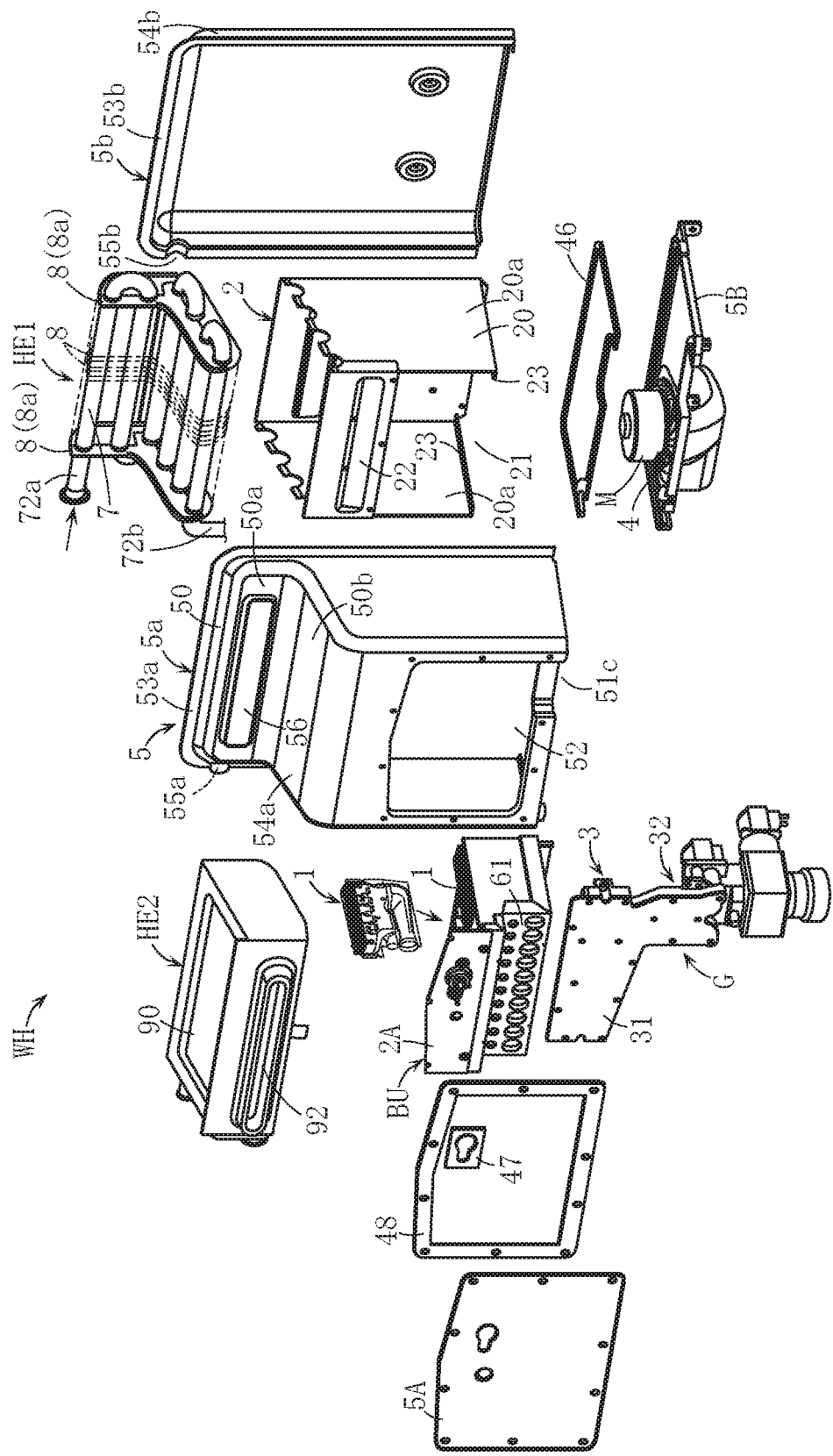
FIG. 4 is an exploded perspective view of the water heater shown in FIG. 1.

A water heater WH shown in FIG. 1 is configured as a hot water supply device, and as shown in FIGS. 2 to 4, includes a burner unit BU (a burner set) in which a plurality of burners 1 are held side by side, a combustion chamber case 2, a gas supply manifold G, a fan 4, a drive motor M thereof, a primary heat exchanger HE1, a secondary heat exchanger HE2, a unit case 5, and a temperature fuse F (not shown in FIG. 4).

An air pressure chamber 59, to be described below, is provided in an outside region of the combustion chamber case 2 and the primary heat exchanger HE1 within an inside region of the unit case 5. The primary heat exchanger HE1 corresponds to an example of the "heat exchanger" according to the present invention.

Figure 5:
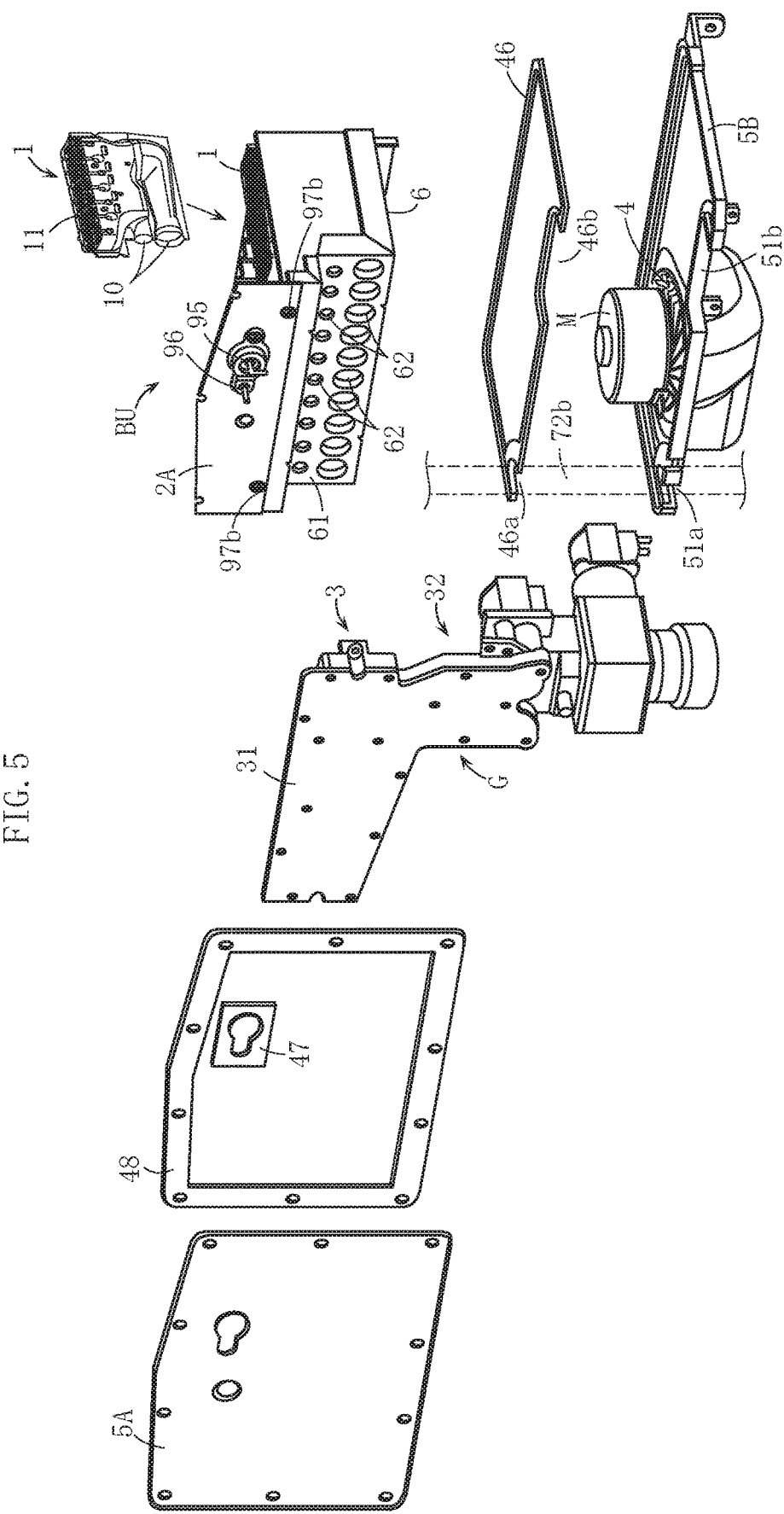
FIG. 5 is an enlarged perspective view showing a part of the constituent elements shown in FIG. 4.

Each of the burners 1 is a gas burner and a combustion tube. As shown in FIG. 5, each burner 1 has an overall flat shape with a gas introduction port 10 provided in a front end thereof. Fuel gas introduced into the interior of the burner 1 together with combustion air through the gas introduction port 10 can be burned on a flame hole surface 11 forming an upper surface of the burner 1.

In FIGS. 2, 3, and 5, the gas supply manifold G includes a substantially plate-shaped gas ejection head 3 provided with a plurality of nozzles 30, and a gas supply portion 32 connected thereto. The gas supply portion 32 includes a pressure control valve, a plurality of open/close valves, and so on. Fuel gas supplied to the gas supply portion 32 through a gas pipe or the like, not shown in the figures, can be ejected through each of the plurality of nozzles 30 on the gas ejection head 3.

In the burner unit BU, the plurality of burners 1 are placed and held in an aligned state on a flow regulating plate portion 6 of a burner holder portion BH. The flow regulating plate portion 6 includes a plurality of air vents 60 (see FIG. 2) through which combustion air supplied from the fan 4 passes upward toward a combustion chamber 29. A front-side upright wall portion 61 erected on a front portion of the flow regulating plate portion 6 is provided with a hole portion 62 through which the fuel gas ejected through the nozzles 30 of the gas supply manifold G can be introduced into a gas introduction port 10 of the burner 1. The gas supply manifold G is incorporated into the burner unit BU by fastening an upper portion of a back plate portion 31 of the gas ejection head 3 to the front-side upright wall portion 61 using a screw 97a. A front-side region (the left-side region in FIG. 2) of the back plate portion 31 forms a part of the air pressure chamber 59.

In FIG. 4, the combustion chamber case 2 is formed by joining a front wall portion 22 to a front-side upper portion of a frame body portion 20 that is C-shaped when seen from above and has an open front surface, and the space below the front wall portion 22 serves as a first opening portion 21. The first opening portion 21 can be blocked by a combustion chamber front lid 2A. As is illustrated clearly in FIGS. 2 and 5, the combustion chamber front lid 2A is attached to the front-side upright wall portion 61 of the burner unit BU via a screw 97b so that when the burner unit BU is housed in the combustion chamber case 2, the first opening portion 21 can be blocked by the combustion chamber front lid 2A. A spark plug 95 and a flame rod 96 for detecting a flame are attached to the combustion chamber front lid 2A so as to penetrate the combustion chamber front lid 2A. In FIGS. 3 and 4, a pair of bent support pieces 23 extending substantially horizontally in a front-rear direction are provided on lower portions of left and right side wall portions 20a of the combustion chamber case 2 (also see FIGS. 6 and 7), and the burner unit BU is carried on the pair of bent support pieces 23.

Figure 6:
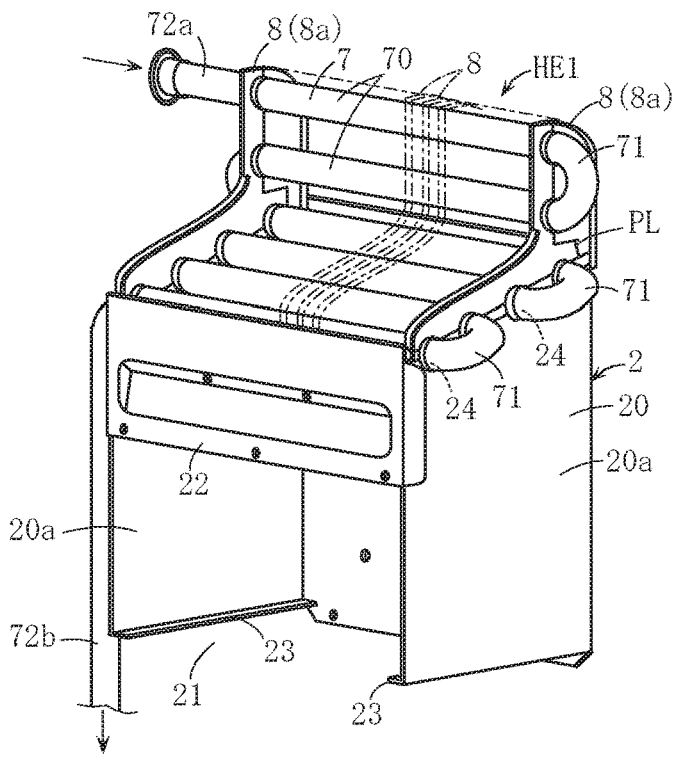
FIG. 6 is a perspective view showing main parts of a configuration relating to a primary heat exchanger of the water heater shown in FIG. 1.
Figure 7:
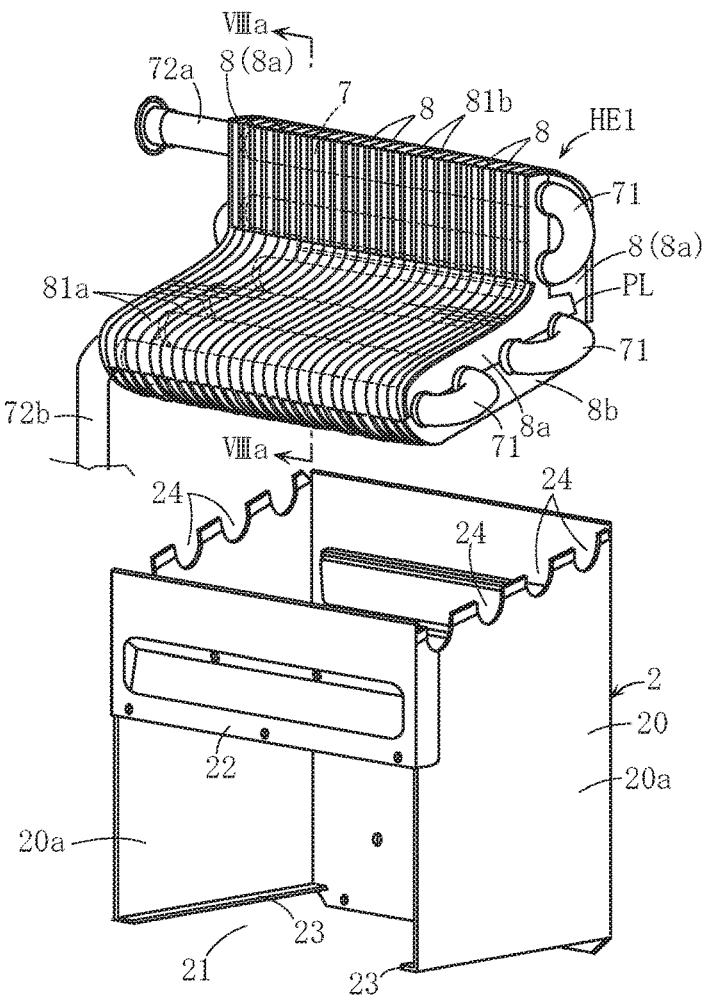
FIG. 7 is an exploded perspective view of FIG. 6.

As shown in FIGS. 6 to 9, the primary heat exchanger HE1 includes a meandering heat transfer tube 7 and a plurality of plate-shaped fins 8 joined to the heat transfer tube 7 (FIG. 6 shows only some of the fins 8). The heat transfer tube 7 includes a plurality of straight tube body portions 70 and a plurality of bent tube portions 71 connecting the straight tube body portions 70 in series. The plurality of fins 8 are arranged at appropriate intervals in a longitudinal direction of the straight tube body portions 70 of the heat transfer tube 7.

A plurality of upwardly open recessed portions 24 are provided in an upper portion of the combustion chamber case 2. Parts of the heat transfer tube 7 projecting to the outside of the two end fins 8 (8a) are fitted into the recessed portions 24, whereby the primary heat exchanger HE1 is supported in the upper portion of the combustion chamber case 2. A region near lower portions of the two end fins 8 (8a) and the left and right side wall portions 20a of the combustion chamber case 2 contact each other so that no large gaps are formed therebetween.

Each of the fins 8 is formed by combining first and second fin plates 8a, 8b that are divided by a parting line PL. According to this configuration, each of the fins 8 can be attached so that the heat transfer tube 7 is sandwiched between the first and second fin plates 8a, 8b. As a result, an operation to attach the fins 8 to the heat transfer tube 7 can be performed easily.

Each fin 8 has a substantially L-shaped side face so as to correspond to the shape of an upper portion of the unit case 5. More specifically, as shown in FIG. 2, the upper portion of the unit case 5 includes, as means for connecting the secondary heat exchanger HE2 easily and rationally, a narrow portion 50 having a narrower front-rear width than the lower portion side of the unit case 5, an exhaust port 56 provided in a front wall portion 50a of the narrow portion 50, and a shelf-form wall portion 50b connected to a lower portion of the front wall portion 50a. The secondary heat exchanger HE2 is placed on the shelf-form wall portion 50b. Thus, combustion gas passing through the primary heat exchanger HE1 flows into the secondary heat exchanger HE2 through the exhaust port 56. Each of the fins 8 is disposed such that an upper portion thereof is positioned in the narrow portion 50 and a remaining part extends along a lower surface of the shelf-form wall portion 50b. The plurality of straight tube body portions 70 of the heat transfer tube 7 are arranged in accordance with the fins 8.

Each fin 8 includes bent pieces 81a, 81b bent substantially at right angles. The bent pieces 81a, 81b are parts for guiding combustion gas advancing toward the primary heat exchanger HE1 from therebelow to the exhaust port 56. The bent piece 81a is provided on an upper edge portion of a frontward part of the fin 8, and the bent piece 81b is provided to extend continuously from an upper edge portion along a rear-side edge portion of a rearward part of the fin 8. Bent pieces such as those described above are not provided on a part of the fin 8 opposing the exhaust port 56.

As is clearly illustrated in FIG. 7 and FIGS. 8A to 8C, adjacent bent pieces 81a and adjacent bent pieces 81b contact each other so that no gaps are formed therebetween (excluding a location for forming an opening portion 58 serving as an air passage, to be described below). According to this configuration, the combustion gas that advances upward toward the primary heat exchanger HE1 from therebelow enters the gaps between the plurality of fins 8 and then impinges on the bent pieces 81a, 81b. As a result, the combustion gas is prevented from passing upward as is between the plurality of fins 8, and accordingly, the combustion gas is guided appropriately to the exhaust port 56. As shown in FIG. 2, respective upper ends of the front wall portion 22 and a rear wall portion 20b of the combustion chamber case 2 contact the bent pieces 81a, 81b of the fins 8 so that the combustion gas does not leak out from these parts.

In the figure, a reference numeral 82 denotes a burring portion set in a state of being externally fitted onto the heat transfer tube 7 (in the other figures, the burring portion 82 is either simplified or omitted).

The secondary heat exchanger HE2 is used to recover latent heat and configured such that a heat transfer tube 91 is housed in a case 90. Combustion gas passing through the exhaust port 56 of the unit case 5 advances through the case 90, whereby latent heat is recovered therefrom by the heat transfer tube 91, after which the combustion gas is discharged to the outside through an exhaust port 92. A hot water-discharging pipe body portion of the secondary heat exchanger HE2 is connected to a water-introducing pipe body portion 72a of the primary heat exchanger HE1 in order to deliver hot water heated by the secondary heat exchanger HE2 to the heat transfer tube 7 of the primary heat exchanger HE1.

The unit case 5 is a case surrounding the entirety of the combustion chamber case 2 and the primary heat exchanger HE1, and as shown in FIG. 4, includes a unit case front portion 5a and a unit case rear portion 5b (abbreviated where appropriate to "the unit case front portion 5a and rear portion 5b" hereafter). The unit case front portion 5a is a member with open rear and lower surface portions, and includes a flange portion 53a formed continuously from an upper portion and left/right side portions, and a bulging portion Ma bulging frontward from the flange portion 53a. The unit case rear portion 5b is a member with open front and lower surface portions, and includes a flange portion 53b formed continuously from an upper portion and left/right side portions, and a bulging portion 54b bulging rearward from the flange portion 53b. The unit case front portion 5a and rear portion 5b are assembled so as to sandwich the combustion chamber case 2 and the primary heat exchanger HE1 from the front-rear direction thereof.

The unit case front portion 5a and rear portion 5b are assembled by bringing the flange portions 53a, 53b, which serve as mating faces, into contact with each other and performing crimping thereon. As illustrated in the enlarged view of main parts in FIG. 2, this crimping is achieved by, for example, providing a bent-back piece 53c in advance on one of the flange portions 53a, 53b and sandwiching the other flange portion 53a, 53b between the bent-back piece 53c and the flange portion 53a, 53b including the bent-back piece 53c. According to this configuration, the unit case front portion 5a and rear portion 5b can be assembled easily, without the need for screw fastenings in a large number of locations.

In FIG. 4, a pair of opposing recessed portions 55a, 55b are provided in the flange portions 53a, 53b. When the flange portions 53a, 53b are joined to each other, the water-introducing pipe body portion 72a of the primary heat exchanger HE1 is disposed in an opening portion formed by a combination of the pair of recessed portions 55a, 55b, whereby the water-introducing pipe body portion 72a is sandwiched from the front and rear sides by respective inner surface portions of the pair of recessed portions 55a, 55b. Thus, the water-introducing pipe body portion 72a can be drawn out to the exterior of the unit case 5 from the interior while ensuring that no gaps are formed between the water-introducing pipe body portion 72a and the unit case 5. As will be described below, the hot water-discharging pipe body portion 72b is drawn out downward from the interior of the unit case 5.

A second opening portion 52 is provided in a front wall portion of the unit case 5, and the second opening portion 52 can be blocked by a unit case front lid 5A. As shown in FIG. 2, the unit case front lid 5A is attached to the front wall portion of the unit case 5 via a screw 97c, and a rectangular frame-shaped member 48 is interposed as means for securing a sealing property in the attachment location. Packing 47 is likewise used to secure a sealing property in the attachment locations of the spark plug 95 and the flame rod 96.

As shown in FIG. 3, the second opening portion 52 is sized so that the burner unit BU can be inserted into and removed from the unit case 5. Preferably, the second opening portion 52 is sized so that when the combustion chamber front lid 2A is attached to the burner unit BU, these components can be inserted into and removed from the unit case 5 as is. The unit case 5 is configured such that in a state where the second opening portion 52 is blocked using the unit case front lid 5A, the interior thereof, excluding the exhaust port 56 described above and a fan air supply port 57 to be described below, is hermetically sealed.

The fan 4 and the drive motor M are mounted on an upper surface side of a bottom lid 5B of the unit case 5 so as to be housed in the unit case 5 and positioned below the burner unit BU. The bottom lid 5B is attached to the unit case 5 using a screw or the like, not shown in the figures, so as to block a lower portion opening portion of the unit case 5, and includes the air supply port 57, which communicates with an air intake port of the fan 4. The bottom lid 5B is preferably formed from a comparative thick metal such as die-cast aluminum. According to this configuration, superior effects can be achieved in terms of cooling the drive motor M and suppressing noise and vibration during driving of the fan 4.

When attaching the bottom lid 5B, sealing packing 46 such as that shown in FIG. 5 is preferably used. First recessed portions 46a, 51a and second recessed portions 46b, 51b are provided respectively in the sealing packing 46 and the bottom lid 5B. The first recessed portions 46a, 51a are sites for drawing out the hot water-discharging pipe body portion 72b of the primary heat exchanger HE1 downward to the exterior of the unit case 5 from the interior thereof. The second recessed portions 46b, 51b are sites for disposing the gas supply portion 32 coupled to the gas supply manifold G. As shown in FIG. 4, a third recessed portion 51c is provided in the unit case front portion 5a, and the gas supply portion 32 is also disposed in the third recessed portion 51c.

In FIG. 2, the fan 4 is used to blow air around an impeller 40. An air-blowing opening portion 44 that uses a partition plate 45 is provided on an upper side of the fan 4, and air discharged from the fan 4 passes upward through the opening portion 44. This air is used as primary combustion air that advances into the gas introduction port 10 of the burner 1 and secondary air that passes through the air vents 60 and advances to the region where the burners 1 are disposed. The air also advances into a region of the unit case 5 on the outside of the combustion chamber case 2 and the primary heat exchanger HE1.

This outside region forms the air pressure chamber 59. Pressure P3 in the air pressure chamber 59 is higher than pressure P1 in the combustion chamber 29 and pressure P2 in the primary heat exchanger HE1 (pressure in the gaps between the fins 8). As regards the pressure P1 in the combustion chamber 29 and the pressure P2 in the primary heat exchanger HE1, large air flow passage resistance is generated by the air vents 60 and the burners 1, and therefore this pressure difference occurs regardless of the air supplied from the shared fan 4.

The temperature fuse F is provided in the air pressure chamber 59 and preferably provided in an upper portion of the air pressure chamber 59. The temperature fuse F disconnects when the temperature detected thereby rises abnormally to or above a predetermined temperature. When the temperature fuse F disconnects, a source solenoid valve (not shown) of a fuel gas pipe system, for example, closes. In the water heater WH, an opening portion 58 serving as an air passage for generating an air flow is provided in the location of the temperature fuse F and on the periphery thereof. The opening portion 58 is provided by removing a part of the bent pieces 81b of the fins 8 of the primary heat exchanger HE1 or the like, for example. According to this configuration, air in the air pressure chamber 59 passes through the opening portion 58, flows in between the fins 8, and then advances into the exhaust port 56 and the secondary heat exchanger HE2. Hence, air does not remain in the location of the temperature fuse F, and as a result, the operation of the temperature fuse F can be stabilized.

Next, actions of the water heater WH will be described.

First, a relationship of P3>P1, P3>P2 exists between the respective pressures P1, P2 in the combustion chamber 29 and primary heat exchanger HE1 and the pressure P3 in the air pressure chamber 59, i.e. the outside region thereof. Thus, leakage of the combustion gas in the combustion chamber 29 and the primary heat exchanger HE1 into the air pressure chamber 59 is appropriately prevented or suppressed. As a result, the hermetic sealing property in attachment locations of the combustion chamber case 2, the respective parts of the primary heat exchanger HE1, and other members does not have to extremely high in order to prevent the combustion gas from leaking out of the combustion chamber 29 and the primary heat exchanger HE1.

To provide specific examples, in the contact location between the combustion chamber case 2 and the combustion chamber front lid 2A, the contact location between the combustion chamber case 2 and the fin 8 of the primary heat exchanger HE1, the contact locations between the bent pieces 81a of the fins 8, the contact locations between the bent pieces 81b, the attachment locations of the spark plug 95 and the flame-detecting flame rod 96, and so on, the need to use expensive sealing packing, tighten dimension management of the members that contact each other, and assemble these members with a high degree of precision in order to secure a superior hermetic sealing property between the members can be eliminated. As a result, the overall productivity of the water heater WH can be improved, leading to a reduction in the manufacturing cost thereof.

The front-side region (the opposite side to the nozzles 30) of the back plate portion 31 of the gas supply manifold G forms a part of the air pressure chamber 59, and therefore the fuel gas discharged from the nozzles 30 is reliably prevented from advancing incorrectly to the front-side region of the gas supply manifold G.

In this embodiment, a part of the combustion air discharged from the fan 4 is supplied to the air pressure chamber 59, and using the difference in flow passage resistance, the air pressure chamber 59 is set at a higher pressure than the combustion chamber 29 and the primary heat exchanger HE1. Hence, the need to provide a dedicated fan separately to the fan 4 to increase the pressure in the air pressure chamber 59 can be eliminated, leading to a reduction in manufacturing cost. Note, however, that a configuration in which a dedicated fan for increasing the pressure in the air pressure chamber 59 is used separately may be employed in the present invention.

As described above, the unit case 5 is configured simply by combining the unit case front portion 5a and rear portion 5b. Further, as means for assembling these portions, the flange portions 53a, 53b, which are respectively connected to the unit case front portion 5a and rear portion 5b in series, are brought into contact so as to face each other and then crimped. Thus, productivity is improved in comparison with a case where a large number of locations of the flange portions 53a, 53b are fastened by screws. As a result, a reduction in manufacturing cost can be achieved, which is even more preferable. The region on the inside of the crimping location of the flange portions 53a, 53b forms the air pressure chamber 59 and a region in which no combustion gas exists, and therefore, even if a location in which the hermetic sealing property is slightly reduced occurs in the crimped part, combustion gas does not leak out from that part.

As shown in FIG. 3, by removing the unit case front lid 5A so that the second opening portion 52 is left open, the burner unit BU can be extracted through the front of the unit case 5. Therefore, maintenance operations and the like can be performed easily on the burner unit BU. In a state where the burner unit BU has been removed, maintenance operations can be performed on the fan 4 and the drive motor M through the first and second opening portions 21 and 52. The fan 4 and the drive motor M are housed in the unit case 5, and therefore drive noise generated thereby can be blocked by the unit case 5. As a result, a noise reduction effect can also be obtained.

In addition, with the water heater WH according to this embodiment, the structure for incorporating the primary heat exchanger HE1 into the combustion chamber case 2 is simple, and a dedicated component for guiding the combustion gas that passes through the primary heat exchanger HE1 to the secondary heat exchanger HE2 is not required. As a result, a reduction in the overall manufacturing cost of the water heater WH can be further promoted. Moreover, the temperature fuse F can be reduced in size, thereby reducing the component cost thereof, while at the same time, the temperature fuse F can accurately sense an abnormal temperature increase caused by so-called hole defect or the like, and as a result, the safety of the water heater WH can be improved.

FIGS. 10 to 16 show other embodiments of the present invention. In these figures, identical or similar elements to those of the above embodiment have been allocated identical reference numerals to the above embodiment, and duplicate description thereof has been omitted.

Figure 10:
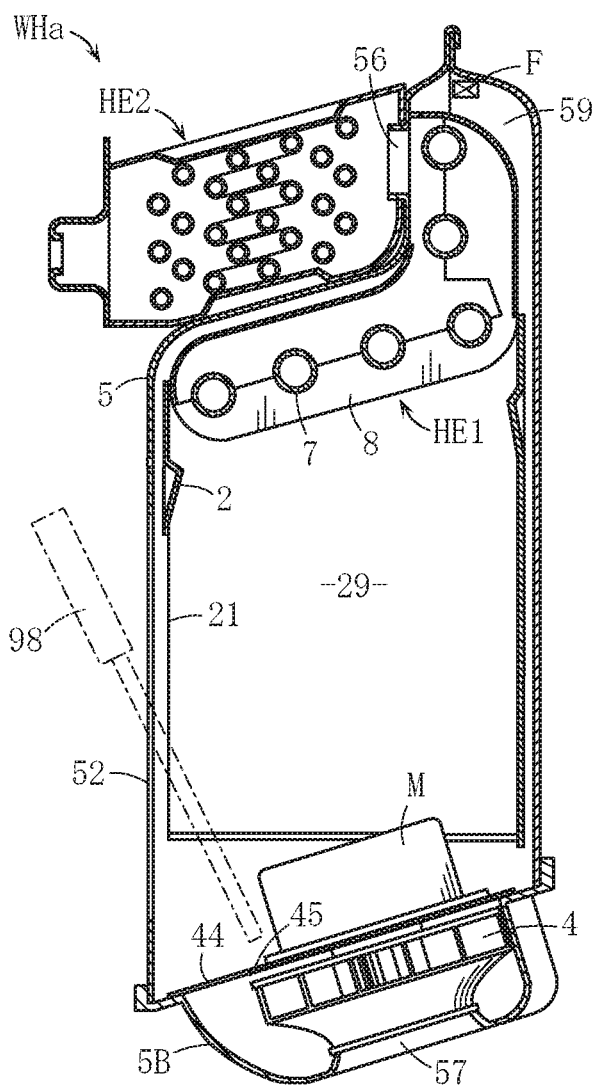
FIG. 10 is a side sectional view showing another example of the present invention.

In a water heater WHa shown in FIG. 10, the fan 4 and the drive motor M are provided in a tilted attitude with the front side thereof inclined downward. This configuration is achieved by tilting the upper surface of the bottom lid 5B, to which the fan 4 and the drive motor M are attached, so that the front side thereof is inclined downward.

According to this embodiment, the attachment locations of the fan 4 and the drive motor M can easily be seen from the outside through the first and second opening portions 21, 52. Further, when a tool 98 such as a screwdriver is inserted into the attachment locations of the fan 4 and the drive motor M, the screwdriver does not have to be set in a vertically upright attitude, and therefore a maintenance operation can be performed while the handle of the tool 98 remains positioned on the outside of the unit case 5, for example. When the entire tool 98 is inserted into the unit case 5 and set in a vertically upright attitude, an upper end of the tool 98 may interfere with the primary heat exchanger HE1, but in this embodiment, this danger can be eliminated or reduced, and as a result, workability can be improved.

Figure 11:
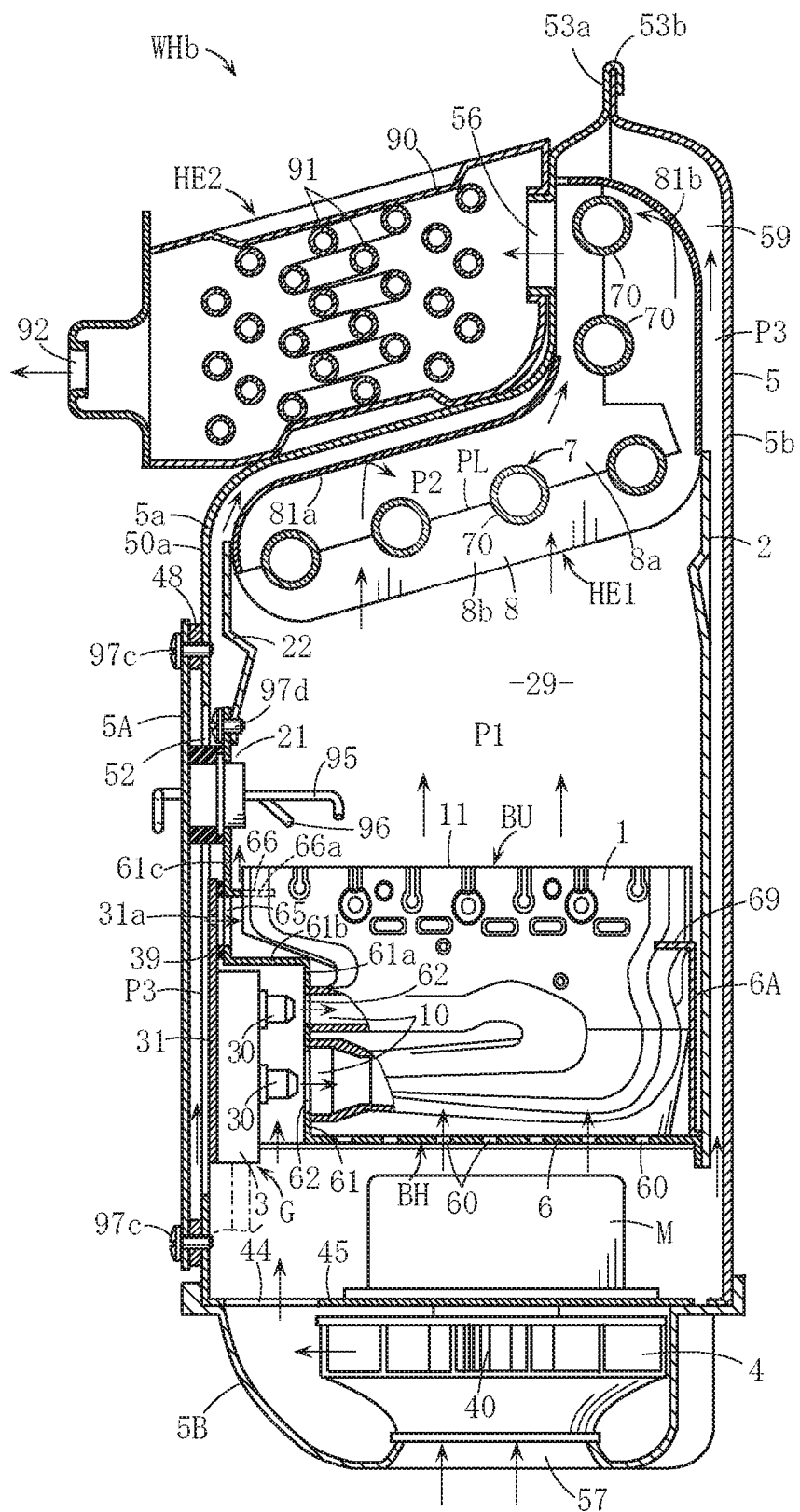
FIG. 11 is a side sectional view showing another example of the present invention.
Figure 12:
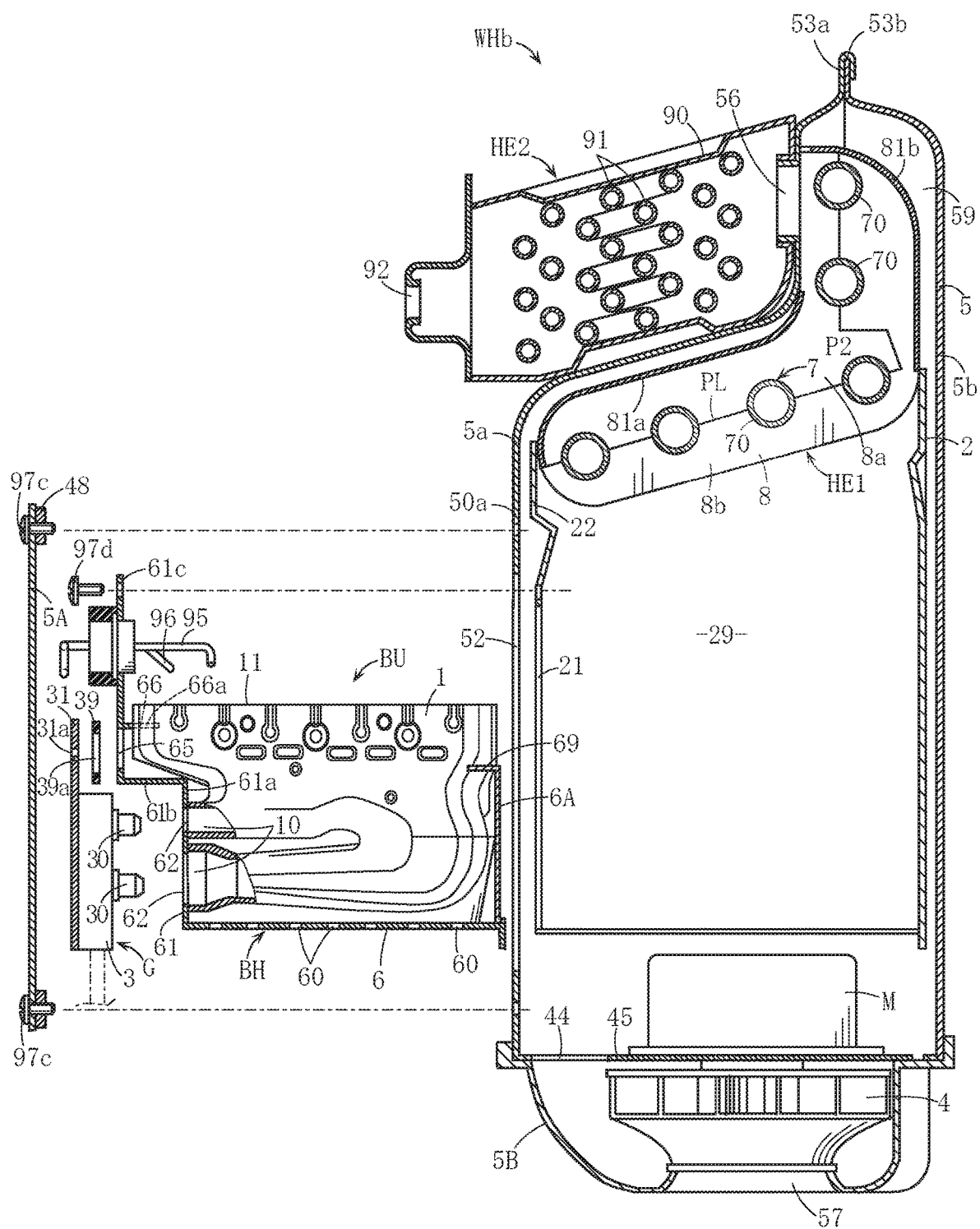
FIG. 12 is an exploded side sectional view of FIG. 11.

In a water heater WHb shown in FIGS. 11 and 12, a plurality of opening portions 65 and a plurality of cut-and-raised portions 66a are provided in the burner holder portion BH.

More specifically, the front-side upright wall portion 61 of the burner holder portion BH includes an upright plate portion 61c that is erected in an up-down height direction and connected integrally, via a horizontal plate portion 61b, to an upper portion of a lower portion wall portion 61a in which a plurality of fuel gas supply hole portions 62 are provided. The plurality of opening portions 65 and the plurality of cut-and-raised portions 66a are provided in the upright plate portion 61c. The plurality of cut-and-raised portions 66a are sites that are bent and erected so as to extend toward the rear side of the upright plate portion 61c (the side on which the burners 1 are disposed) from respective upper edge portions of the plurality of opening portions 65, and are formed by implementing cutting and raising processing on the upright plate portion 61c. The plurality of opening portions 65 are the opening portions formed as a result of the cutting and raising processing. The plurality of opening portions 65 and the plurality of cut-and-raised portions 66a are provided so as to be arranged intermittently in a left-right lateral width direction of the upright plate portion 61c. A plurality of recessed grooves 66b for inserting and engaging the narrow front end portions of the respective burners 1 are provided at appropriate intervals in each cut-and-raised portion 66a (also see FIG. 16). In other words, the cut-and-raised portions 66a form a burner engaging/holding portion 66.

Figure 15:
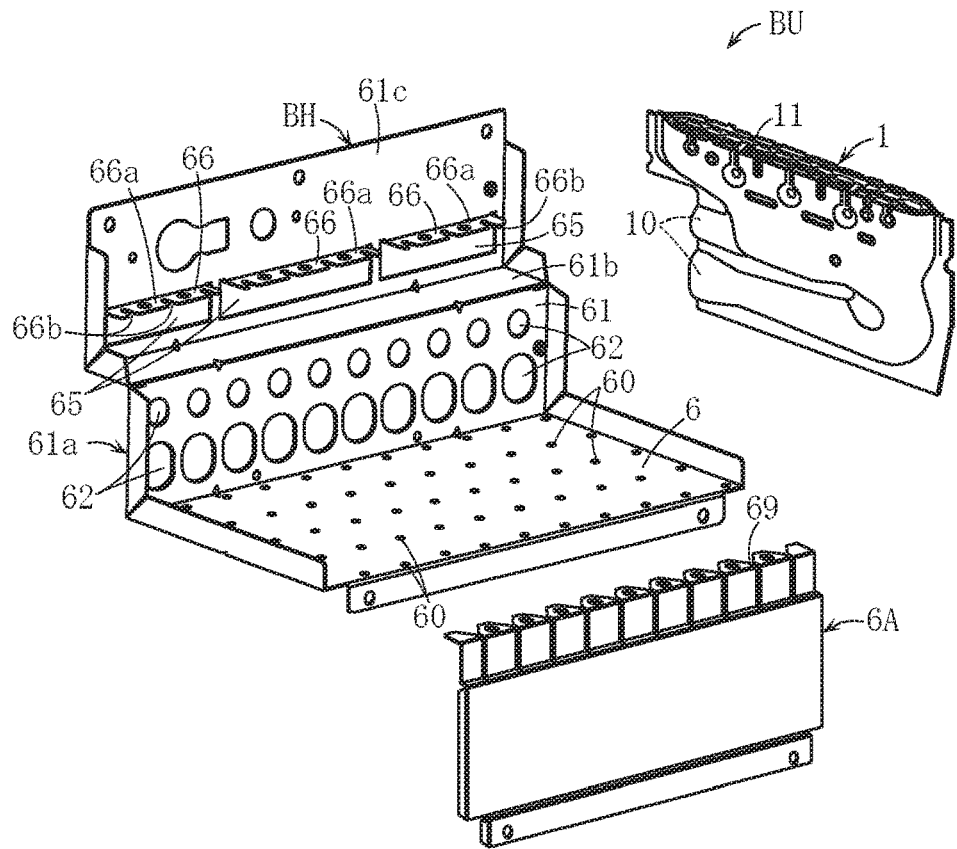
FIG. 15 is an exploded rear perspective view showing main parts of a burner holder portion shown in FIG. 14.
Figure 16:
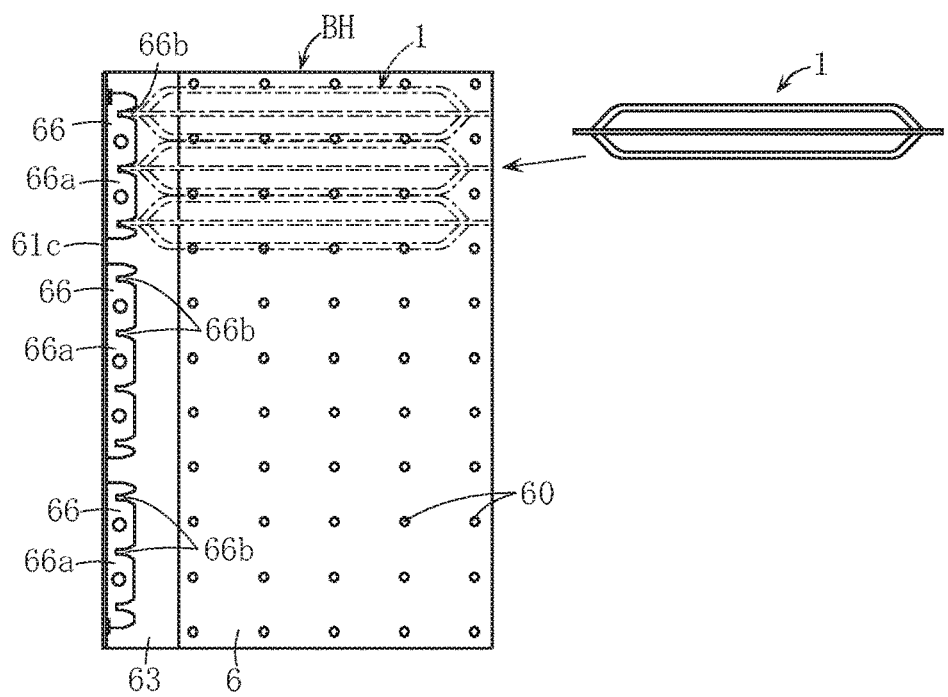
FIG. 16 is a schematic plan view showing main parts of the burner holder portion and a burner shown in FIG. 15.

In FIGS. 11, 12, and 15, a back plate portion 6A is provided in an upright attitude on a rear portion of the flow regulating plate portion 6 of the burner holder portion BH. A rear-side burner engaging/holding portion 69 is bent and formed on an upper portion of the back plate portion 6A, and a plurality of recessed grooves for inserting and engaging the rear end portions of the plurality of burners 1 are provided therein. Thus, the plurality of burners 1 are held appropriately side by side in the burner holder portion BH in a state where the front end portions and rear end portions thereof are positioned using the burner engaging/holding portions 66, 69 (this configuration can also be applied to the burner holder portion BH of the water heater WH shown in FIGS. 1 to 9).

The gas ejection head 3 of the gas supply manifold G includes a back plate portion 31 that opposes the front surface of the upright plate portion 61c via sealing packing 39. The back plate portion 31 is fastened to the upright plate portion 61c by a screw 97a (see FIG. 14). When attached, the back plate portion 31 blocks the plurality of opening portions 65 in the upright plate portion 61c. The sealing packing 39 includes a plurality of opening portions 39a corresponding to the plurality of opening portions 65 so that high-temperature combustion gas and radiant heat from the combustion chamber 29 above the burner 1 are prevented as far as possible from acting on the sealing packing 39.

As described above, the back plate portion 31 of the gas ejection head 3 blocks the opening portions 65. However, a plurality of air flow holes 31a connecting the air pressure chamber 59 to the interior of the combustion chamber case 2 are provided in the location of the back plate portion 31 that faces the opening portion 65. The pressure P3 in the air pressure chamber 59 is higher than the pressure P1 in the combustion chamber case 2, and therefore a part of the air in the air pressure chamber 59 can flow into the combustion chamber case 2 through the plurality of air flow holes 31a. The air that flows into the combustion chamber case 2 in this manner then flows upward along the inner surface of the upright plate portion 61c and the inner surface of the front wall portion 22 of the combustion chamber case 2, thereby air-cooling these parts, and therefore the air serves to protect these parts from serious thermal damage.

Figure 13:
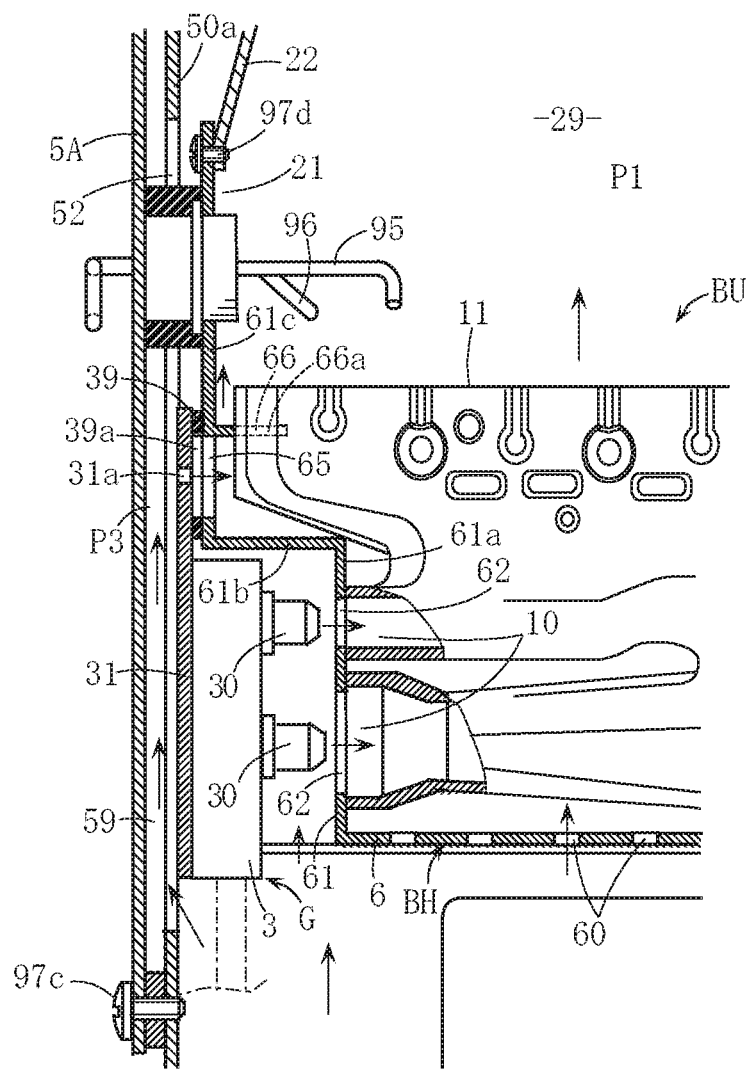
FIG. 13 is an enlarged sectional view showing main parts of FIG. 11.
Figure 14:
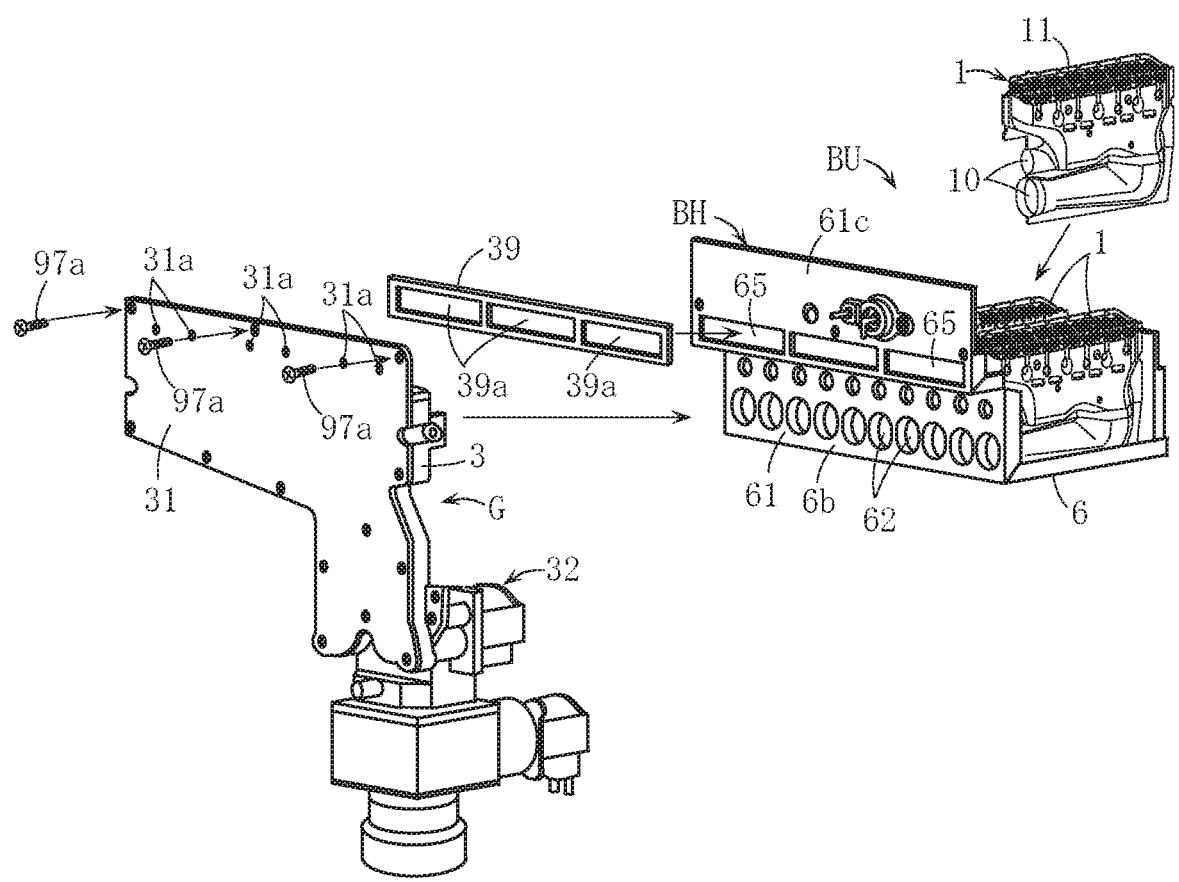
FIG. 14 is an exploded perspective view showing main parts of a water heater shown in FIG. 11.

As is clearly illustrated in FIGS. 11 and 12, the upright plate portion 61c of the burner holder portion BH is fastened to the front wall portion 22 of the combustion chamber case 2 by a screw 97d (also see FIG. 13). A spark plug 95 and a flame-detecting flame rod 96 are attached to the upright plate portion 61c. By attaching the spark plug 95 and the flame rod 96 to the burner holder portion BH, positioning precision between the burners 1 and these components can be improved.

In the water heater WHb, as described above, the burner engaging/holding portion 66 for positioning the front portions of the burners 1 is formed using the cut-and-raised portions 66a provided in the upright plate portion 61c of the burner holder portion BH. Hence, there is no need to provide a separate, dedicated member for forming the burner engaging/holding portion 66, and as a result, the number of components can be reduced, leading to a reduction in manufacturing cost.

The burner engaging/holding portion 66 is not provided on the uppermost end of the front-side upright wall portion 61, and a part of the upright plate portion 61c stands upright further toward the upper side than the burner engaging/holding portion 66. By employing this configuration, the spark plug 95 and the flame rod 96 can be attached to the upright plate portion 61c, and the positioning precision between the burners 1 and these components can be improved. The upright plate portion 61c, in addition to being used as a site for attaching the burner holder portion BH to the combustion chamber case 2, is used as a site for appropriately blocking the first opening portion 21 and preventing combustion gas leakage from this part. Therefore, the upright plate portion 61c has a rational configuration.

An opening portion 65 for providing the cut-and-raised portions 66a is provided in the upright plate portion 61c, but the opening portion 65 is blocked by the back plate portion 31 of the gas ejection head 3. Hence, there is no need to provide a separate, dedicated member to block the opening portion 65, and as a result, a reduction in manufacturing cost can be further promoted. The opening portion 65 is divided into a plurality rather than being formed as a single large opening portion, and is therefore provided in a reduced size. Hence, problems caused by the opening portion 65, such as a large reduction in the strength of the upright plate portion 61c, can be avoided appropriately.

Furthermore, in this embodiment, as described above, the air that flows into the combustion chamber case 2 from the air pressure chamber 59 through the air flow holes 31a provided in the back plate portion 31 of the gas ejection head 3 flows along the inner surface sides of the upright plate portion 61c and the front wall portion 22 of the combustion chamber case 2, thereby realizing actions for cooling and protecting these parts. As a result, the need to provide a separate member for protecting the inner surfaces of the upright plate portion 61c and the front wall portion 22 from thermal damage can be eliminated.

The present invention is not limited to the content of the embodiments described above. The specific configurations of the respective parts of the water heater according to the present invention can be subjected to various design modifications freely, within the intended scope of the present invention.

In the above embodiments, the heat transfer tube of the heat exchanger (the primary heat exchanger) is held directly by the combustion chamber case, but the present invention is not limited thereto. For example, the heat exchanger may be configured such that the heat transfer tube is housed in a frame-shaped can body and the can body is connected to the combustion chamber case. The specific configuration of the heat exchanger is not limited. The present invention may be configured such that the secondary heat exchanger is not provided.

The air pressure chamber is preferably provided in the region on the outside of the heat exchanger as well as the region on the outside of the combustion chamber case, as in the above embodiments. Instead, however, the air pressure chamber may be provided only in the region on the outside of the combustion chamber case. Likewise with this configuration, in comparison with the prior art, a combustion gas leakage prevention effect is obtained.

The unit case is not limited to a combination of the unit case front portion and the unit case rear portion and may be configured otherwise. The shape of the unit case is not limited to a shape having a narrow portion in the upper portion thereof, as in the above embodiments, and may be shaped so as not to include the narrow portion. The exhaust port of the unit case may be provided in the rear wall portion of the unit case, for example, instead of the front wall portion. The fan and the drive motor thereof are preferably provided in the unit case but may be provided so as to be exposed to the outside of the unit case. The type of fan is also not limited.

The water heater according to the present invention is not limited to a hot water supply device and may be configured as a water heater used for heating, a water heater used to melt snow, and so on, for example. The present invention may also be applied to a reverse combustion type water heater in which combustion gas generated by a burner advances downward so as to be supplied to a heat exchanger positioned below the burner.

The invention claimed is:

1. A water heater comprising:
   a fan;
   at least one burner that receives a supply of combustion air from the fan;
   a heat exchanger used for heat recovery;
   a combustion chamber case configured such that a combustion chamber of the burner is formed in the interior thereof and so as to be capable of guiding combustion gas generated by the burner to the heat exchanger;
   a unit case surrounding the combustion chamber case; and
   an air pressure chamber formed from a region on the outside of the combustion chamber case within the unit case and set at a higher pressure than the combustion chamber, wherein
   the unit case includes a unit case front portion and a unit case rear portion that are couplable to each other,
   the unit case front portion and the unit case rear portion can be assembled so as to sandwich the combustion chamber case and the heat exchanger from a front-rear direction thereof,
   a plurality of flange portions are provided on respective outer peripheries of the unit case front portion and the unit case rear portion,
   the unit case front portion and the unit case rear portion are coupled to each other by bringing the plurality of flange portions into contact with each other and performing crimping thereon,
   a bottom lid is attached to the unit case to block a lower opening portion of the unit case, and
   the fan and a drive motor thereof are housed in the unit case and mounted on the bottom lid of the unit case such that the fan and drive motor are disposed proximal the combustion chamber case.

2. The water heater according to claim 1, wherein
   a part of the combustion air discharged from the fan is supplied to the combustion chamber, the other part being supplied to the air pressure chamber, and
   the pressure in the air pressure chamber is higher than the pressure in the combustion chamber because flow passage resistance in an air flow passage extending from the fan to the combustion chamber is greater than flow passage resistance in an air flow passage extending from the fan to the air pressure chamber.

3. The water heater according to claim 1, wherein
   the air pressure chamber is provided to extend to a region on the outside of the heat exchanger within the unit case, and
   the pressure in the air pressure chamber is higher than the pressure in a region inside the heat exchanger.

4. The water heater according to claim 1, wherein
   at least one of a water-introducing pipe body portion and a hot water-discharging pipe body portion of the heat exchanger is drawn out to the exterior of the unit case from the interior thereof so as to be sandwiched between mating faces of the unit case front portion and the unit case rear portion.

5. The water heater according to claim 1, further comprising:
   a combustion chamber front lid capable of blocking a first opening portion provided in a front surface portion of the combustion chamber case; and
   a unit case front lid capable of blocking a second opening portion provided in a front surface portion of the unit case,
   wherein, in a state where the first and second opening portions are open, the burner is capable of being inserted into and removed from the combustion chamber case from the exterior of the unit case.

6. The water heater according to claim 5, wherein
   the fan and the drive motor thereof are housed in the unit case so as to be positioned below the burner and are tilted such that a front side thereof is inclined downward, whereby the fan and the drive motor thereof decrease steadily in height toward parts thereof close to the first and second opening portions.

7. The water heater according to claim 1, wherein
   a recessed portion shaped to open upward is provided in an upper portion of the combustion chamber case such that a heat transfer tube of the heat exchanger is capable of being fitted therein and held thereby.

8. The water heater according to claim 1, wherein
   the heat exchanger is set as a primary heat exchanger,
   the water heater further comprises a secondary heat exchanger for heating water to be heated, which is configured separately from the primary heat exchanger,
   an upper portion of the unit case is provided with a narrow portion having a smaller front-rear width than other parts of the unit case, and a shelf-form wall portion connected to a front side or a rear side of a lower portion of the narrow portion in order to carry the secondary heat exchanger,
   an exhaust port is provided in a front wall portion or a rear wall portion of the narrow portion, and combustion gas that advances upward from the burner and passes through the primary heat exchanger is supplied to the secondary heat exchanger through the exhaust port.

9. The water heater according to claim 1, further comprising:
   a temperature fuse provided in the air pressure chamber in order to sense an abnormal increase in the temperature of the air pressure chamber.

10. The water heater according to claim 9, further comprising:
    an air passage for causing air in the air pressure chamber to flow out to a site different from the air pressure chamber such that an air flow is generated in the location of the temperature fuse.

11. The water heater according to claim 1, further comprising:
    a gas supply manifold that is disposed in the unit case so as to be positioned on a front side of the burner, and supplies the burner with fuel gas.

12. The water heater according to claim 11, wherein
    a front-side region of the gas supply manifold forms a part of the air pressure chamber.

13. The water heater according to claim 11, further comprising:
    a burner holder portion, wherein
    the burner holder portion includes a flow regulating plate portion on which the burner is placed, a front-side upright wall portion that stands upright from a front portion of the flow regulating plate portion and has a hole portion for supplying fuel gas to the burner therein, and a burner engaging/holding portion provided on the front-side upright wall portion in order to fix the position of a front portion of the burner, the front-side upright wall portion includes an upright plate portion erected in an up-down height direction above the hole portion for supplying fuel gas, and a cut-and-raised portion connected integrally to the upright plate portion and bent so as to extend to a rear side of the upright plate portion from an edge portion of an opening portion provided in the upright plate portion, the burner engaging/holding portion is formed from the cut-and-raised portion, and the gas supply manifold is positioned on a front side of the upright plate portion so as to block the opening portion.

14. The water heater according to claim 13, further comprising:

sealing packing that is interposed between the gas supply manifold and the upright plate portion and open in a location facing the opening portion.

15. The water heater according to claim 13, comprising, as the opening portion and the cut-and-raised portion, a plurality of opening portions and a plurality of cut-and-raised portions arranged intermittently in a left-right lateral width direction of the upright plate portion.

16. The water heater according to claim 13, wherein an air flow hole enabling a part of the air in the air pressure chamber to flow into the combustion chamber case through the opening portion in the upright plate portion is provided in the gas supply manifold.

* * * * *